(No Model.) 3 Sheets—Sheet 2.

J. C. POTTS.
FRICTION CLUTCH.

No. 387,810. Patented Aug. 14, 1888.

Witnesses.
Jas. L. Skidmore.
G. F. Downing.

Inventor,
Joseph C. Potts,
by his attorneys
Howson and Howson.

(No Model.) 3 Sheets—Sheet 3.
J. C. POTTS.
FRICTION CLUTCH.
No. 387,810. Patented Aug. 14, 1888.
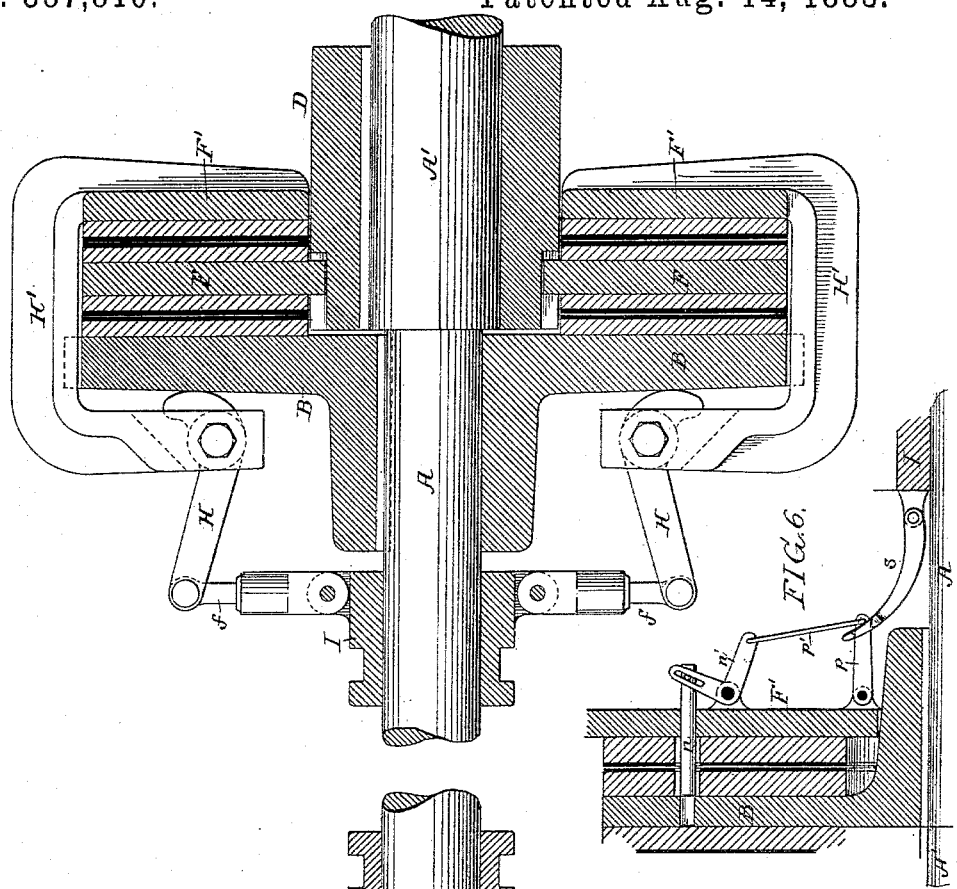
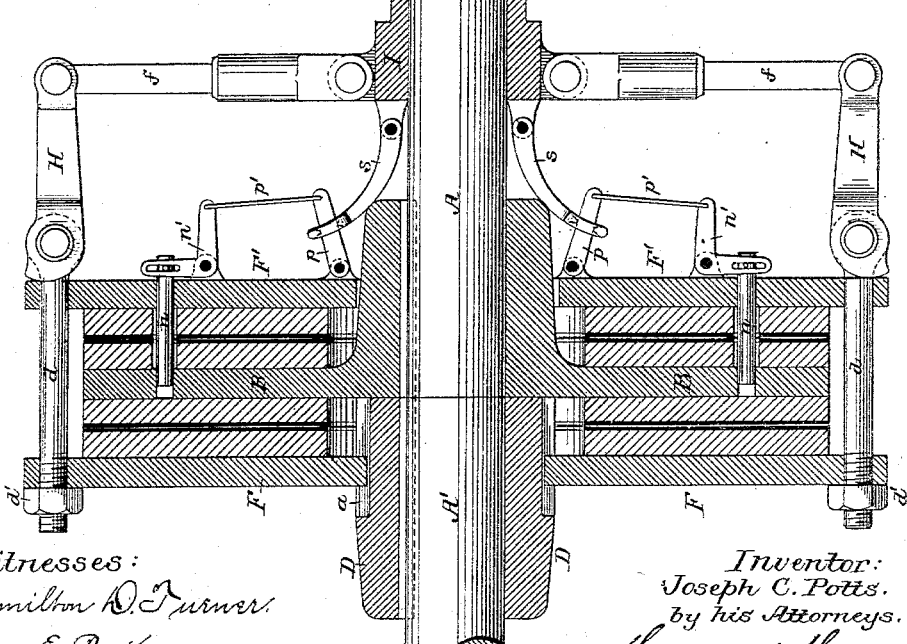
Witnesses:
Hamilton D. Turner
John E. Parker
Inventor:
Joseph C. Potts.
by his Attorneys.
Howson & Howson

UNITED STATES PATENT OFFICE.

JOSEPH C. POTTS, OF BERWYN, PENNSYLVANIA, ASSIGNOR OF ONE-HALF TO JOSEPH H. COATES, OF SAME PLACE.

FRICTION-CLUTCH.

SPECIFICATION forming part of Letters Patent No. 387,810, dated August 14, 1888.

Application filed April 7, 1888. Serial No. 269,945. (No model.)

*To all whom it may concern:*

Be it known that I, JOSEPH C. POTTS, a citizen of the United States, and a resident of Berwyn, in Chester county, Pennsylvania, have invented certain Improvements in Friction-Clutches, of which the following is a specification.

One object of my invention is to so modify the construction of friction-clutch shown in my patent, No. 357,095, dated February 1, 1887, as to adapt the same for use as a shaft-coupling, further objects being to provide powerful clutching mechanism, to relieve the shafts from longitudinal strain on the operation of the clutch, and to provide for the positive locking of the disks together in addition to the frictional clutching of said disks. These objects I attain in the manner hereinafter set forth, reference being had to the accompanying drawings, in which—

Figure 1:
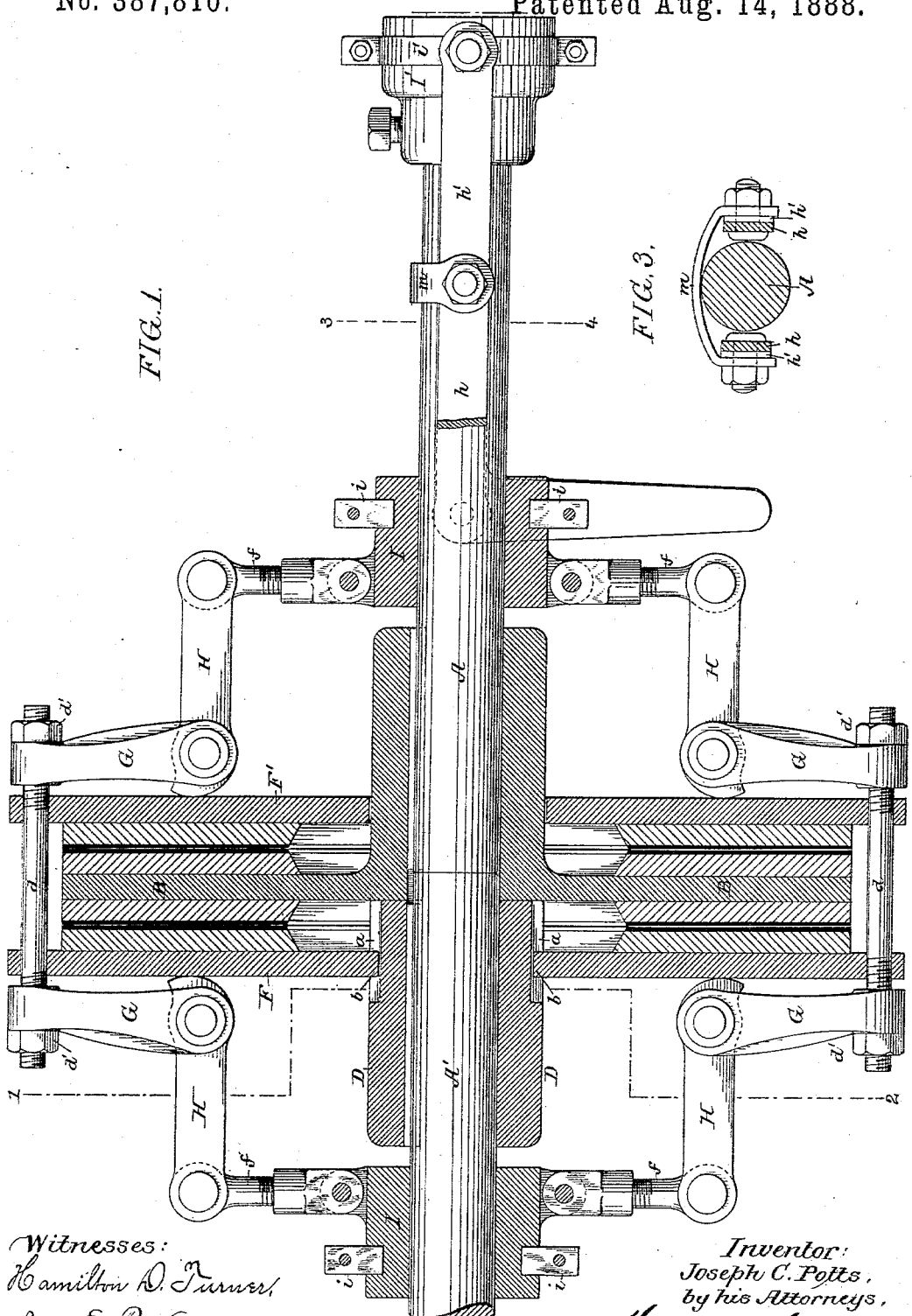
Figure 2:
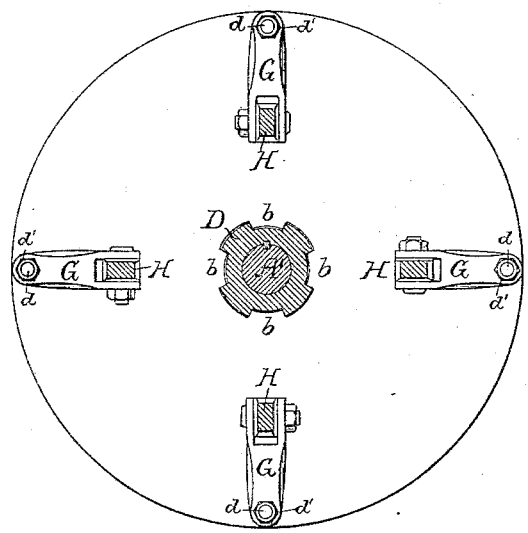

Figure 1 is a longitudinal section of a shaft-coupling constructed in accordance with my invention. Fig. 2 is a transverse section of the same on the line 1 2, but on a smaller scale. Fig. 3 is a transverse section on the line 3 4, Fig. 1; and Figs. 4 to 6, views illustrating other forms of clutch embodying my invention or illustrating special features of the same.

In Fig. 1, A A' represent the two shafts which are to be coupled together, the shaft A having a disk or wheel, B, the hub of which is keyed or otherwise firmly secured to the shaft, so as to be incapable of turning independently thereof. To the shaft A' is keyed or otherwise secured a hub, D, which has a series of longitudinal grooves, *a*, for the reception of lugs *b*, projecting inward from a disk, F, which is thus compelled to turn with the hub, but is free to slide longitudinally thereon and from and toward the disk B. Sliding longitudinally on the hub of the disk B is a disk, F', and the inner faces of the disks F F' and both faces of the disk B are provided with leather-faced wooden blocks or other equivalent friction-surfaces, as shown in Fig. 1.

To openings near the peripheries of the disks F and F', outside of the periphery of the disk B, are adapted a series of bolts, *d*, the opposite ends of which are provided with hangers G, carrying cam-levers H, the short arms of which bear upon the outer faces of the disks F F', while their long arms are connected by rods *f* to suitable pivot-lugs on grooved sleeves I, one of which is free to slide longitudinally on the shaft A, the other sliding on the shaft A'. It will therefore be seen that when the levers are actuated so as to cause their cam-faces to press upon the opposite disks F F' the friction-faces of the latter will be forced into contact with those of the disk B, the disk F' sliding on the hub of said disk B and the disk F sliding on the hub D and being compelled to turn therewith, owing to the engagement of its lugs *b* with the grooves *a* in said hub. Both disks F F' will therefore be clutched to the disk B and all three disks will be compelled to turn together, so that if the shaft A is the driving-shaft its motion will be transmitted to the shaft A' through the medium of the disks B, F, and F' and hub D, while if the shaft A' is the driving-shaft its motion will be transmitted to the shaft A through the medium of the hub D and disks F, F', and B. If desired, only one of the sleeves I may be free to slide, the other having a longitudinal bearing against a fixed collar on its shaft.

The bolts *d* form a simple and effective means of connecting the hangers for the opposite sets of levers, and by threading the outer ends of these bolts and providing them with nuts *d'* ready adjustment of these hangers is permitted to compensate for wear of the parts. This construction is not absolutely essential to the proper carrying out of my invention, however. For instance, in Fig. 4 I have shown cam-levers hung to a frame, H', which engages with notches in the periphery of the disk B, and is thus caused to turn therewith, this frame carrying the disk F', and the disk F being clamped between said disk F' and the disk B.

In ordinary friction clutches or couplings it is usual to hang the lever for operating the sleeve I to a rigid fulcrum adjacent to but independent of the shaft on which the sleeve slides. This plan is objectionable, because the thrust of the lever is exerted to cause endwise movement of the shaft. In order to overcome this objection, I make the operating device in the form of a toggle, one arm, *h*, of which is hung to a slip-ring, *i*, on the sleeve I, the other arm, *h'*, being hung to a like ring, *i'* on a fixed collar, I', on the shaft, so that when the toggle is straightened it will have a tendency to separate the sleeve and collar, and thus cause longitudinal movement of the sleeve, strain on the shaft, however, being prevented, as the pressure in one direction is counteracted by a like pressure in the opposite direction.

In order to prevent undue deflection of the two arms of the toggle, I prefer to provide the jointed ends of the same with a yoke, m, which extends over the shaft and by contact with the latter serves to prevent deflection of the levers after they have reached the straight line or point of greatest extension. (See Figs. 1 and 3.)

It is advisable in many cases to provide for readily locking the disks of the two shafts together, so as to prevent slipping of the shafts in the event of undue strain being exerted upon the driven shaft. I therefore provide a locking-bolt, which is shot into place just before the frictional clutching of the disks is completed, any subsequent rotating movement of one disk independent of the other being thus effectually prevented as long as the clutch is closed. As shown in Fig. 5, this bolt is guided in an opening in the disk F' and is adapted to enter any one of a series of openings in the disk B, these openings being, by preference, of considerable extent circumferentially, so as to increase the likelihood of the bolt entering the same. It should be undestood, however, that, owing to the fact that the frictional clutching of the disks is not yet completed, there is always more or less slipping between the disks at the time the bolt is projected, so that even should the latter happen to strike a solid portion of the disk it will slip past the same and enter one of the openings in the disk.

The bolt n (shown in Fig. 5) is operated by a bell-crank-lever, n', hung to the disk F' and connected by a rod, p', to an arm, p, also hung to said disk, this arm being acted upon by pins carried by the forked end of a curved arm, s, hung to the operating-sleeve I.

When the bolt n is retracted, the arm p occupies a horizontal position, as shown in Fig. 6, and during the earlier portion of the movement of the sleeve I the pins slide along said arm without moving the same; but as the sleeve I nears the limit of its movement the arm s comes in contact with the end of the hub B and its free end is lifted, so as to raise the arm p and project the bolt, a reverse movement being effected on the retraction of the sleeve I.

Having thus described my invention, what I claim, and desire to secure by Letters Patent, is—

1. The combination of the two shafts with a clutching device comprising three disks and means for clamping the outer disks upon the intermediate disk, said intermediate disk being carried by one shaft and the outer disks by the other shaft, and the disk structure of one of the shafts being free to move longitudinally in respect thereto, all substantially as specified.

2. The combination of the two shafts, the three disks, one carried by one shaft and the others by the other shaft, bolts carried by the disks of one shaft, and cam-levers for effecting the forcing of the disks together, all substantially as specified.

3. The combination of the two shafts, the three disks, one carried by one shaft and the others by the other shaft, bolts carried by the latter disks, and two sets of cam-levers carried by said bolts, one set acting on one disk and the other on the other disk, all substantially as specified.

4. The combination of the sliding sleeve of a friction-clutch, a fixed collar on the shaft, slip-rings carried by said collar and sleeve, and toggle-arms connecting said slip-rings, all substantially as specified.

5. The combination of the operating-sleeve of a friction-clutch, a fixed collar on the shaft, toggle-arms connecting the collar and sleeve, and a stop-yoke for limiting the movement of said arms, as set forth.

6. The combination of the operating-sleeve of a friction-clutch, a bolt for positively locking the parts of the clutch together, a bell-crank lever connected to said bolt, an arm carried by the sleeve of the clutch, and an intermediate pivoted arm connected to said bell-crank lever and acted upon by the arm of the sleeve as the latter is moved, substantially as specified.

In testimony whereof I have signed my name to this specification in the presence of two subscribing witnesses.

JOSEPH C. POTTS.

Witnesses:
WILLIAM D. CONNER,
HARRY SMITH.